July 14, 1936.  E. E. JELLEY  2,047,561
REFRACTOMETER
Filed June 6, 1935
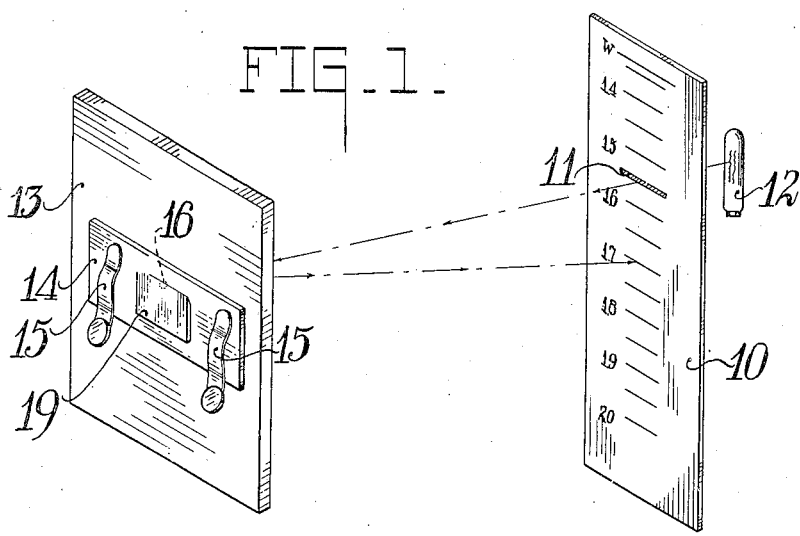
FIG. 1.
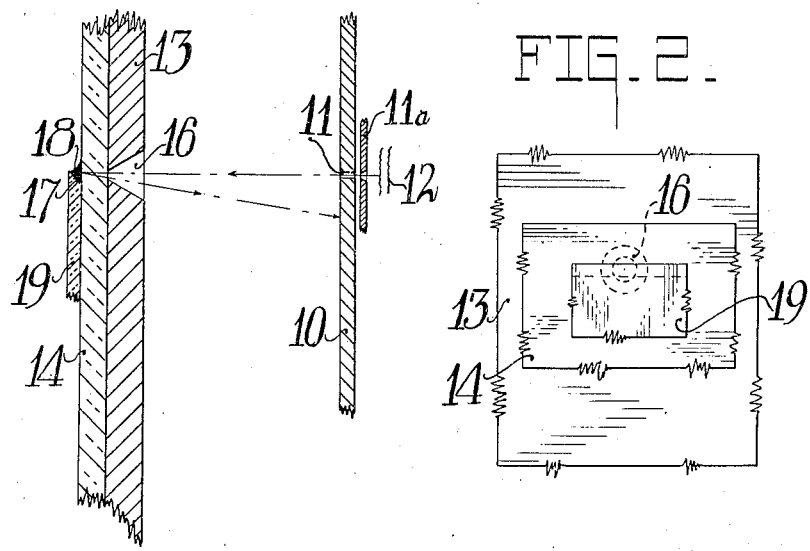
FIG. 2.
FIG. 3.
INVENTOR.
Edwin E. Jelley,
BY
ATTORNEYS.

Patented July 14, 1936

2,047,561

UNITED STATES PATENT OFFICE 2,047,561

REFRACTOMETER

Edwin Ernest Jelley, Harrow, England

Application June 6, 1935, Serial No. 25,228

5 Claims. (Cl. 88—14)

This invention relates to refractometers for determining the refractive indices of substances in the liquid state for rays of different wave lengths.

Such refractometers as are today available need a relatively large quantity of liquid to enable a measurement to be made, and the need for an instrument capable of measuring the refractive index of a very small quantity of liquid has long been felt by chemists who have to identify micro quantities of unknown substances.

Therefore, one object of my invention is to provide a refractometer which will measure the refractive index of a very small quantity of liquid with an accuracy of 0.001 between the limits 1.3 to 2.1. Another object is to provide a refractometer which will be simple to use and sufficiently robust in construction to withstand continuous laboratory or industrial use. Yet another object is to provide a refractometer having the above characteristics at a price which will not preclude its use by industrial and research chemists who have need for it.

Briefly my invention consists of a refractive index scale which is provided with an illuminated slit. Displaced from this index scale and in a plane parallel thereto, I slidably mount an optically worked glass plate on a metal plate having a small aperture which is in alignment with light rays emanating from the illuminated slit in the index scale. The aperture has a diameter of about 2 mm. on the side towards the glass, and expands to a diameter at the other side such that the view of the scale is not obstructed. On the face of this optically worked glass I mount a piece of glass. The edge of this piece of glass, which is parallel to the illuminated slit in the index scale is beveled at approximately 45° to form a pocket for the liquid of which the refractive index is required. The liquid in this pocket takes the form of a small prism, and when the beveled piece of glass is slid up into the ray of light from the illuminated slit, the effect is like that of a camera lucida, whereby a virtual refracted image of the slit is seen superimposed on the index scale in a position which gives a direct reading of the refractive index of the liquid.

The novel characteristics that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing in which:

Fig. 1 is a perspective view of the essential parts of the refractometer.

Fig. 2, partly broken away, is an enlarged elevation showing the prism mounted on the optically worked glass plate and in sighting position with the aperture in the metal supporting plate, and Fig. 3 is an enlarged end section of the essential parts of the refractometer.

Like references refer to corresponding parts in the several figures.

Referring now to the constructional example illustrated in Fig. 1, 10 is a refractive index scale for any given wave length. This scale may be removably mounted on any suitable support, not shown, so that it can be interchanged rapidly with an index scale for a different wave length. The index scale 10 is provided with a narrow slit 11 which is illuminated from the rear by a lamp 12 which is either a sodium, hydrogen, or mercury vapor lamp to give monochromatic light.

An adjustable metal slit 11a may be mounted between the scale and the light source, whereby a narrower slit opening may be obtained than is possible with the slit 11 in the scale. This adjustable slit 11a is preferably placed within a few millimeters of the scale, and is so placed that it is in alignment with the slit 11 in the scale and the small aperture 16 in the metal plate.

As the viewing end of the apparatus is a metal separating plate 13 which has a small conical shaped aperture 16 placed with the small diameter towards the eye and the large diameter towards the slit 11. It is essential that this aperture should not be smaller than 1 m. m. or larger than about 3 m. m., otherwise the instrument will not function. The aperture 16 is made conical in order that the scale should not be obstructed from view, and it is made small in order that there shall be no parallax which would introduce an error in reading.

An optically worked glass plate 14, having a thickness of about 1 m. m., is slidably mounted on the metal plate 13 by spring clips 15 so that it is parallel thereto and on the face of the plate 13 which is away from the index scale 10.

A micro-prism 19 about 0.2 mm. thick, having one edge beveled at approximately 45°, as shown by 17, is placed on the optically worked glass plate 14 so that its beveled edge 17 forms a pocket with the face thereof. A drop of liquid, of which the refractive index is to be found, is placed in the pocket and a minute liquid prism 18 is formed, as shown in Fig. 3. This liquid prism 18 can be formed with as little as .0001 cc. of the liquid to be measured, this feature being very desirable because it provides a very thin layer of liquid and thereby increases the accuracy of measurements in strongly colored liquids. The micro-prism 19 may be held in position by the capillary attraction of the liquid itself, or, if it is necessary to work with quantities less than .01 m. m. of liquid, it is cemented in position. Seccotine is a satisfactory cement for organic liquids, and Canada balsam is satisfactory for most aqueous solutions.

After this prism of liquid 18 is formed, the micro-prism 19 on its supporting glass plate is slid upward so that it partially closes the aperture 16 in the metal holder 13, as shown in Fig. 2. With the liquid prism 18 and the aperture 16 in this latter relation, the effect is that of a camera lucida, whereby a virtual refracted image of the slit 11 is viewed through the aperture 16 in the holder 13, and seen superimposed upon the index scale 11 in a position which gives a direct reading of the refractive index with an accuracy of ±.001 between the limits 1.30 and 2.1. The index scale 10 is computed from the angle and refractive index of the micro-prism.

To find the refractive index of any liquid with this device the first step is to be sure that the index scale 10 is figured on the proper wave length to correspond with the specific requirements of the test. A small drop of the liquid to be measured, as little as .0001 cc., is placed in the pocket formed between the beveled edge 17 of the micro-prism 19 and the face of the glass plate 14 and a tiny prism 18 of the liquid is formed. The glass plate 14 is then adjusted until the micro-prism 19 is in position to partially cut off the aperture 16 in the holder 13, and bring the tiny liquid prism 18 into alignment with the light rays emanating from the illuminated slit 11 as shown in Fig. 2. In this position an effect similar to that of a camera lucida is obtained, whereby a virtual refracted image of the slit is seen superimposed upon the index scale 10 in a position which gives a direct reading of refractive index with an accuracy of ±.001 between the limits 1.30 to 2.1.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I declare is new and desire to secure by Letters Patent of the United States is:

1. A refractometer comprising a refractive index scale, said index scale provided with a slit, suitable means behind said scale for illuminating said slit, an apertured metal separating plate displaced from and in a plane parallel to said index scale, an optically worked glass plate slidably mounted on said metal plate, and a piece of glass having a 45° bevel on one edge, said piece of glass being mounted on said slidable optically worked glass plate for bringing its beveled edge into the field of said aperture in said metal plate.

2. In a microrefractometer the combination of a refractive index scale having an illuminated slit therein, an apertured metal separating plate displaced from and in a plane parallel to said index scale and having an optically worked glass plate slidably mounted thereon, and a piece of glass mounted on one face of said optically worked glass plate, the edge of said piece of glass adjacent said glass plate being beveled to form a pocket for the liquid to be measured.

3. In a microrefractometer the combination of an interchangeable refractive index scale having an illuminated slit therein, an apertured metal separating plate displaced therefrom and in a plane parallel to said index scale, an optically worked glass plate slidably mounted on one face of said metal plate, and a piece of glass mounted on one face of said glass plate, said piece of glass having its edge adjacent said glass plate and nearest the aperture in said metal plate beveled to form a pocket for the liquid to be measured.

4. In a microrefractometer the combination of a refractive index scale, said scale having an illuminated slit therein, a metal separating plate mounted in a plane parallel to the plane of said index scale, said metal plate having an aperture in alignment with the light rays emanating from said illuminated slit, an optically worked piece of glass slidably mounted on said metal plate, and a piece of glass mounted face to face with said slidable glass plate, and having one of its edges parallel to said illuminated slit; the edge of said piece of glass adjacent the glass plate, parallel to the illuminated slit and nearest the aperture in said metal plate beveled to form a pocket for the liquid to be measured.

5. In a refractometer the combination of a refractive index scale having an illuminated index scale, a metal separating plate mounted in a plane parallel to the plane of said index scale, said metal plate having an aperture in alignment with the light rays emanating from said illuminated slit in said index scale, an optically worked glass plate slidably mounted on the face of said metal plate, and a prism mounted on the face of said glass plate, the contacting faces of said glass plate and prism forming a pocket for the liquid to be measured.

EDWIN ERNEST JELLEY.